March 29, 1960 L. P. DE ZELAR 2,930,304
CAMERA BACK ASSEMBLY
Filed July 18, 1958 2 Sheets-Sheet 1
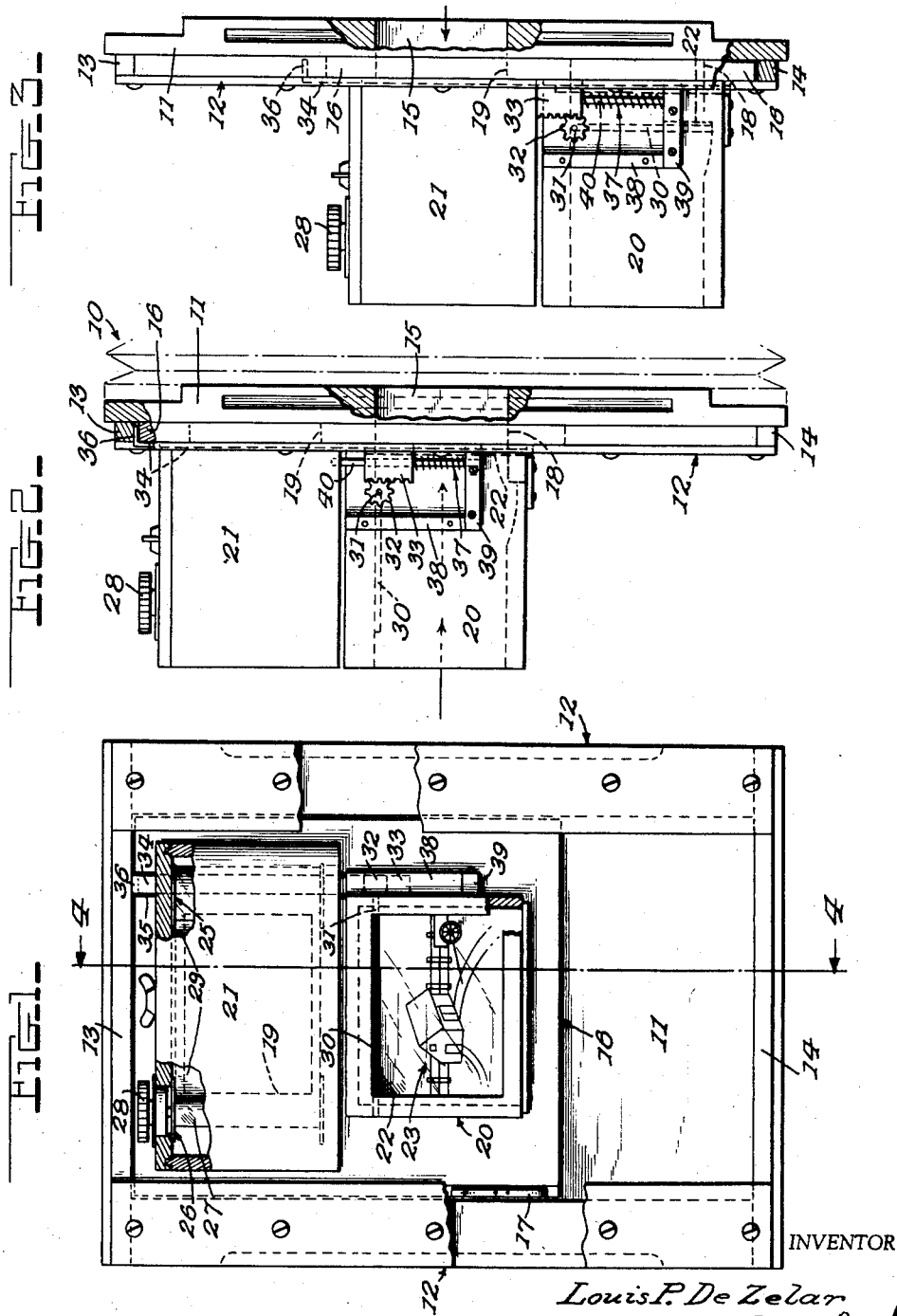
INVENTOR
Louis P. De Zelar
BY
ATTORNEYS March 29, 1960  L. P. DE ZELAR  2,930,304
CAMERA BACK ASSEMBLY
Filed July 18, 1958  2 Sheets-Sheet 2
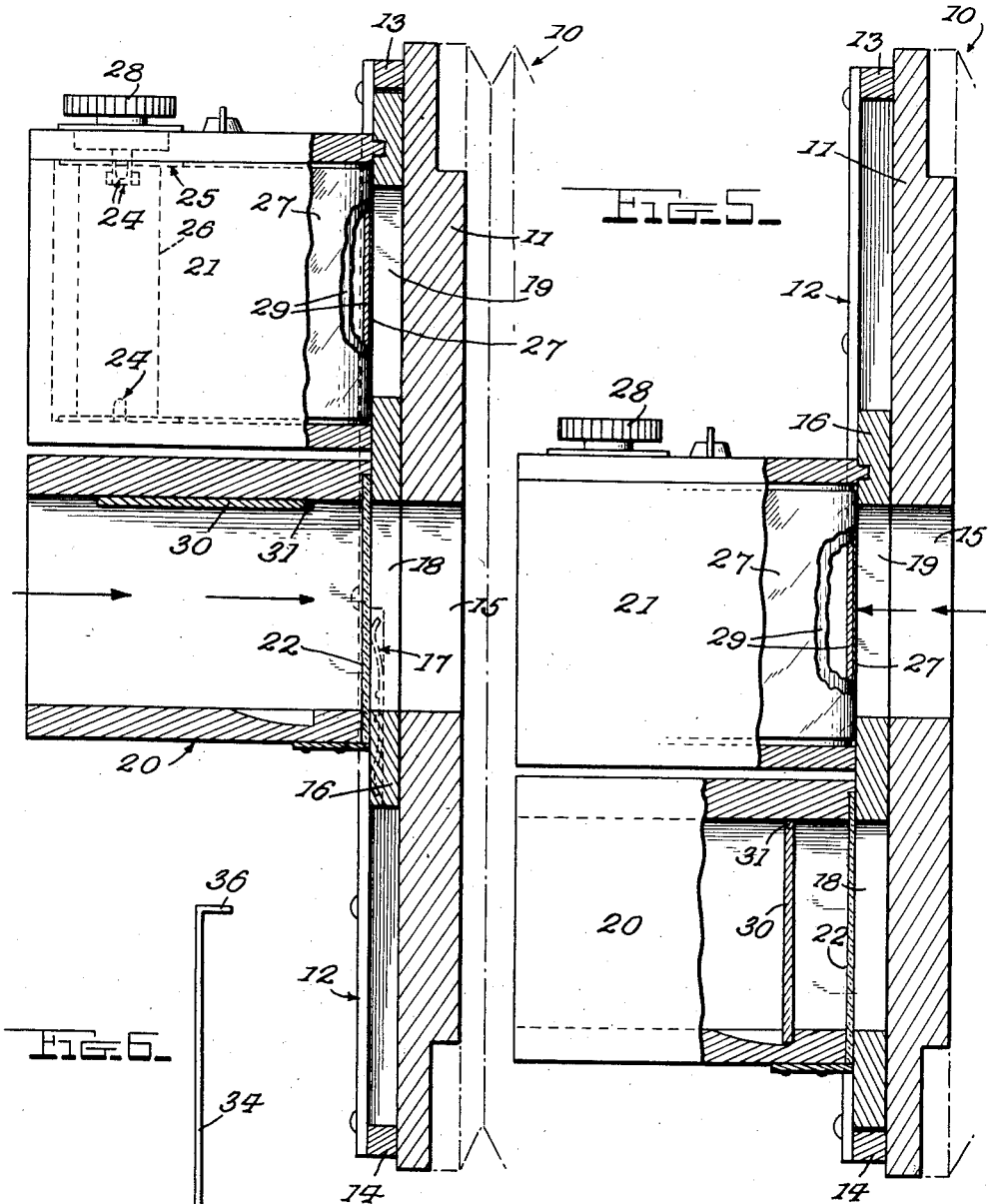
INVENTOR
Louis P. De Zelar
BY Lowry & Rinehart
ATTORNEYS

United States Patent Office 2,930,304
Patented Mar. 29, 1960

2,930,304

CAMERA BACK ASSEMBLY

Louis P. De Zelar, Peoria, Ill.

Application July 18, 1958, Serial No. 749,400

3 Claims. (Cl. 95—49)

This invention has been designed to provide a novel camera back assembly enabling the photographer to view an image upon a ground glass or other suitable screen in order to properly position the image and focus the camera, and then with one operation permitting the movement of said screen to an idle position and the movement of a sensitive film into the position previously occupied by said screen, whereby upon exposure of the film the image will be captured exactly as seen on the said screen.

In carrying out the above end, the camera back has been provided with a slide shiftable from one position to another and vice versa. This slide carries an image-viewing casing and a film magazine and said slide has a screen exposure opening and a film exposure opening communicating with said image-viewing casing and film magazine, respectively. The image-viewing casing contains a translucent screen to receive an image from the camera lens when the slide occupies a focusing and image-viewing position; and the film magazine is provided with means for positioning the film across the aforesaid film exposure opening, whereby, after focusing and properly positioning the image on the screen, the slide may be shifted to film exposure position and the picture taken as it appeared on the screen.

A further object of the invention has been to provide a light barrier within the image-viewing casing and movable from an idle position to an operative position in which it covers the ground glass or other screen, and vice versa, and to provide automatic operating means for said barrier, to move it to idle position when the slide is shifted to image-viewing position and to operative position when said slide is shifted to film-exposing position.

A still further object has been to provide simple and effective operating means for the aforesaid light barrier, said operating means being brought into operation by the shifting of the slide to its two positions.

With the above and other objects in view that will become apparent as the nature of the invention is better understood, the same consists in the novel form, combination and arrangement of parts hereinafter more fully described, shown in the accompanying drawing, and particularly claimed.

In the accompanying drawings,

Fig. 1 is a rear view of the assembly, partly broken away and in section and showing the slide in image-viewing position;

Fig. 2 is a side elevation, partly broken away and in section, the slide being in image-viewing position;

Fig. 3 is a view similar to Fig. 2 but showing the slide in film-exposure position;

Fig. 4 is an enlarged view partly in elevation and partly in section on line 4—4 of Fig. 1, the slide being in image-viewing position;

Fig. 5 is a similar view with the slide in film exposure position; and

Fig. 6 is a side elevation of the rack bar and slide bar forming elements of the operating means for the light barrier.

The construction shown in the drawings will be rather specifically described but it is to be understood that this construction is to a large extent illustrative rather than limiting. Moreover, while the invention is shown in a position in which the slide is shiftable vertically, it is usable to equal advantage in a position in which said slide would be shiftable horizontally, depending upon the position in which the camera is fixedly mounted (or manually held).

The invention is intended primarily for use with a portrait or view camera having a bellows at the front end of which a lens and shutter are mounted, the bellows being extensible and contractible for focusing. The rear portion of such a bellows is indicated at 10 by broken lines, and it may be connected by any preferred means with the camera back 11. This back 11 is rectangular, its longitudinal edges are provided with suitable slide guides 12, and its ends have slide stop abutments 13 and 14. The back 11 is formed with an opening 15 which is aligned with the axis of the lens.

A flat rectangular slide 16 contacts snugly with the rear side of the back 11 and is slidably engaged with the guides 12 for manual shifting to the focusing and image-viewing position of Figs. 1, 2 and 4, and to the film exposure position of Figs. 3 and 5. The shifting of the slide to these positions is limited by the abutments 13 and 14, respectively; and a suitable friction brake 17 is provided to hold said slide in either position.

The slide 16 is formed with a screen exposure opening 18, and with a film exposure opening 19, said openings being selectively registrable with the opening 15 of the back 11 by shifting said slide to one position or the other.

An open-ended image-viewing casing 20 and a film magazine 21 are secured to the rear side of the slide 16. The casing 20 communicates with the slide opening 18 (see Figs. 4 and 5); and the magazine 21 communicates with the slide opening 19.

A ground glass or other translucent image-receiving screen 22 is mounted in and extends across the casing 20 behind the opening 18. When the slide 16 occupies the position of Figs. 1, 2 and 4, an image from the camera lens will be received by said screen 22 and may be readily viewed by the photographer to get it into clear focus and to properly position it. An illustrative image 23 is shown in Fig. 1.

The magazine 21 contains conventional means 24 for mounting a supply spool 25 and a winding spool 26 of sensitive film 27; and a knob 28 is illustrated for turning said winding spool. A suitable film guiding and positioning plate 29 is provided to so position the film 27 that it spans the slide opening 19 as seen in Figs. 4 and 5. Thus, when the slide 16 is shifted to the position of Figs. 3 and 5 and the film 27 is exposed, the image 23 will be captured exactly as it appeared on the screen 22 when said slide occupied the position of Fig. 1.

A light barrier 30 is pivotally mounted in the casing 20 for movement from the idle position of Figs. 1, 2 and 4, to the operative position of Figs. 3 and 5. In this latter position the barrier 30 covers the screen 22 and prevents light from passing through said screen and possibly reaching the film 27. As the barrier 30 must occupy its idle position when the screen 22 is to be used and must occupy its operative position when film exposure is to be effected, novel operating means is provided to automatically attain said positions.

The barrier 30 is carried by a rock shaft 31 one end of which is provided with a pinion 32 (Figs. 1 to 3) at the exterior of the casing 20, said rock shaft 31 being disposed transversely of the path of the slide 16. A rack bar 33 (Figs. 1 to 3 and 6) meshes with the pinion 32 and is secured to one end of a longitudinal slide bar 34 which is mounted in a groove 35 (Fig. 1)

in the rear side of the slide 16. The other end 36 of the slide bar 34 is turned forwardly in position to strike the abutment 13. A spring 37 (Figs. 2 and 3) biases the slide bar 34 to a position (Fig. 3) in which it projects beyond the slide 16 toward the abutment 13 whenever the slide 16 occupies film exposure position. The light barrier 30 then occupies closed position as seen in Figs. 3 and 5. After film exposure, when the slide 16 is again shifted to image-viewing position, the end 36 of the slide bar 34 strikes the barrier 13 as said slide 16 nears the end of its movement, whereupon the final movement of said slide 16 will cause the pinion 32 to roll on the rack bar 33, thereby moving the light barrier 30 to the open position of Figs. 1, 2 and 4. When the slide 16 is again moved away from the abutment 13, the spring 37 holds the end 36 of the slide bar 34 against said abutment 13 during the initial portion of the slide movement. Consequently, the pinion 32 then so rolls upon the rack bar as to close the light barrier 30.

Guard bars 38 and 39 (Figs. 1 to 3) are preferably employed for the rack bar 33 and pinion 34; and a cover plate (not shown) may be also employed. The bar 39 is instrumental in supporting one end of a guide rod 40 for the spring 37 and is detachable should it be necessary to remove said spring.

Image viewing and positioning, and focusing, are attained with the slide 16 in the position of Figs. 1, 2 and 4, the light barrier 30 being then open. The slide 16 is then shifted to the film exposure position of Figs. 3 and 5 and during this shifting the light barrier 30 is automatically closed. Upon return of the slide 16 to the position of Figs. 1, 2 and 4, the barrier 30 automatically re-opens.

From the foregoing, it will be seen that novel and advantageous provision has been made for attaining the desired ends. However, attention is invited to the possibility of making variations without departing from the spirit and scope of the invention as claimed.

I claim:

1. A camera back having an opening from its front to its rear side, a slide mounted on the rear side of said back, said slide having a screen exposure opening and a film exposure opening, said screen exposure opening being alone registrable with said opening of said back when said slide is shifted to one position, said film exposure opening being alone registrable with said opening of said back when said slide is shifted to a second position, an open-ended image-viewing casing secured to said slide in registration with said screen exposure opening, a translucent image-receiving screen extending across said image-viewing casing, a film magazine secured to said slide in communication with said film exposure opening, means in said magazine for holding a film in a position in which it spans said film exposure opening, a light barrier movably mounted in said image-viewing casing, said light barrier being mounted for movement from an idle position to an operative position in which it covers said image-receiving screen and vice versa, and operating means for said light barrier, said operating means being so constructed and arranged as to move said light barrier to said idle position when said slide is shifted to said one position for image viewing and to move said light barrier to said operative position when said slide is shifted to said second position for film exposure; said operating means including an actuating element mounted on said slide for movement with respect to the same, an abutment on said camera back in position to hold said actuating element in one position while said slide occupies one of its positions, and means holding said actuating element against said abutment during initial movement of said slide toward its other position.

2. A camera back having an opening from its front to its rear side, a slide mounted on the rear side of said back, said slide having a screen exposure opening and a film exposure opening, said screen exposure opening being alone registrable with said opening of said back when said slide is shifted to one position, said film exposure opening being alone registrable with said opening of said back when said slide is shifted to a second position, an open-ended image-viewing casing secured to said slide in registration with said screen exposure opening, a translucent image-receiving screen extending across said image-viewing casing, a film magazine secured to said slide in communication with said film exposure opening, means in said magazine for holding a film in a position in which it spans said film exposure opening, a light barrier movably mounted in said image-viewing casing, said light barrier being mounted for movement from an idle position to an operative position in which it covers said image-receiving screen and vice versa, and operating means for said light barrier, said operating means being so constructed and arranged as to move said light barrier to said idle position when said slide is shifted to said one position for image viewing and to move said light barrier to said operative position when said slide is shifted to said second position for film exposure; said operating means including an actuating element mounted on said slide for movement with respect to the same, an abutment on said camera back in position to hold said actuating element in one position while said slide occupies one of its positions, and spring means for holding said actuating element against said abutment during the initial movement of said slide toward its other position.

3. A camera back having an opening from its front to its rear side, a slide mounted on the rear side of said back, said slide having a screen exposure opening and a film exposure opening, said screen exposure opening being alone registrable with said opening of said back when said slide is shifted to one position, said film exposure opening being alone registrable with said opening of said back when said slide is shifted to a second position, an open-ended image-viewing casing secured to said slide in registration with said screen exposure opening, a translucent image-receiving screen extending across said image-viewing casing, a film magazine secured to said slide in communication with said film exposure opening, means in said magazine for holding a film in a position in which it spans said film exposure opening, a light barrier pivotally mounted in said image-viewing casing for movement from an idle position to an operative position in which it covers said image-receiving screen, the pivotal axis of said light barrier being transverse to the path of movement of said slide, a pinion coaxial with said pivotal axis and connected with said light barrier for swinging this barrier to and from the aforesaid positions, a rack bar meshing with said pinion, an elongated slide bar carrying said rack bar and mounted slidably on said slide, and means for causing relative sliding of said slide bar and slide to cause said pinion and rack bar to position said light barrier according to the position of said slide, said means comprising an abutment on said camera back and abutting one end of said slide bar while said slide occupies one of its positions, and spring means for holding said slide bar against said abutment during the initial movement of said slide toward its other position.

References Cited in the file of this patent

UNITED STATES PATENTS

| | | |
|---|---|---|
| 1,996,481 | Morgan | Apr. 2, 1935 |
| 2,397,742 | Kals | Apr. 2, 1946 |